US011037071B1

(12) United States Patent
Tekiela et al.

(10) Patent No.: US 11,037,071 B1
(45) Date of Patent: Jun. 15, 2021

(54) CROSS-CATEGORY ITEM ASSOCIATIONS USING MACHINE LEARNING

(71) Applicant: Amazon Technologies, Inc., Seattle, WA (US)

(72) Inventors: Karolina Tekiela, Mercer Island, WA (US); Gabriel Blanco Saldana, Kirkland, WA (US); Rui Luo, Bellvue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1082 days.

(21) Appl. No.: 15/451,355

(22) Filed: Mar. 6, 2017

(51) Int. Cl.
*G06N 20/00* (2019.01)
*G06K 9/46* (2006.01)
*G06Q 30/06* (2012.01)
*G06K 9/62* (2006.01)

(52) U.S. Cl.
CPC ........... *G06N 20/00* (2019.01); *G06K 9/4652* (2013.01); *G06K 9/6232* (2013.01); *G06Q 30/0643* (2013.01)

(58) Field of Classification Search
CPC ........ G06N 20/00; G06N 20/10; G06N 20/20; G06F 17/11; G06K 9/6232; G06K 9/4652; G06Q 30/0643
See application file for complete search history.

(56) References Cited

U.S. PATENT DOCUMENTS

2013/0215116 A1* 8/2013 Siddique .............. G06Q 20/204
345/420
2014/0079297 A1* 3/2014 Tadayon ............ G06K 9/00288
382/118

OTHER PUBLICATIONS

Liu, Si, et al. (2012). "Street-to-shop: Cross-scenario clothing retrieval via parts alignment and auxiliary set." 2012 IEEE Conference on Computer Vision and Pattern Recognition. IEEE, 2012. pp. 3330-3337. (Year: 2012).*
Hu, G.-N. et al. (Jan. 31, 2017)"Integrating reviews into personalized ranking for cold start recommendation." Pacific-Asia Conference on Knowledge Discovery and Data Mining. Springer, Cham, 2017. pp. 708-720. (Year: 2017).*

* cited by examiner

*Primary Examiner* — Kamran Afshar
*Assistant Examiner* — Benjamin J Buss
(74) *Attorney, Agent, or Firm* — Lee & Hayes, P.C.

(57) ABSTRACT

A machine learning engine may be used to identify items in a second item category that have a visual appearance similar to the visual appearance of a first item selected from a first item category. Image data and text data associated with a large number of items from different item categories may be processed and used by an association model created by a machine learning engine. The association model may extract item attributes from the image data and text data of the first item. The machine learning engine may determine weights for parameter types, and the weights may calibrate the influence of the respective parameter types on the search results. The association model may be deployed to identify items from different item categories that have a visual appearance similar to the first item. The association model may be updated over time by the machine learning engine as data correlations evolve.

20 Claims, 9 Drawing Sheets

CROSS-CATEGORY ITEM ASSOCIATIONS USING MACHINE LEARNING

BACKGROUND

An online merchant may provide a number of products and services for sale to customers via the Internet. Customers may access information associated with the products and services through a website or other information service provided by the online merchant. The information associated with the products and services may include information that may be used by the customer to identify and purchase products and services. For example, the information may include one or more images depicting the product and/or textual information including product descriptions, such as, for example, product features, size information, color information, availability, product reviews, and product pricing.

Some online merchants may include search tools on the website to assist customers with identifying a product from the correct product category having the characteristics desired by the customer. Using the search tools, the customer may identify a product in the desired product category having the desired characteristics. However, a customer may want to find a product from a different, second product category that has at least some characteristics that match or are similar to the product already identified by the customer. To identify the second product, the customer may be required to perform a second search for the second product, which may return dozens of products from the second product category, many of which may not be particularly relevant. Thus, the customer may be required to review the many products identified by the second search to determine whether any of the products from the second product category have the desired similarities with the first product, which may be undesirably tedious and time consuming. Thus, the second search conducted in this manner may suffer from a number of possible drawbacks. For example, many of the search results may not have the desired similarities to the first product. Further, the search results may not identify a second product that would be suitable to the customer due to differences between first product and the second products identified by the second search. Moreover, conducting the second search, in addition to potentially providing unsatisfactory results, may be slow and thus time consuming, which may result in inefficient use of computing resources, such as power, network bandwidth, processing time, and memory.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 4A shows a first UI to facilitate selection of a first item. FIG. 4B shows a second UI to facilitate creating associations using an association model. FIG. 4C shows a third UI to facilitate selection of a second item that is associated with the first item.

DETAILED DESCRIPTION

Figure 1A:
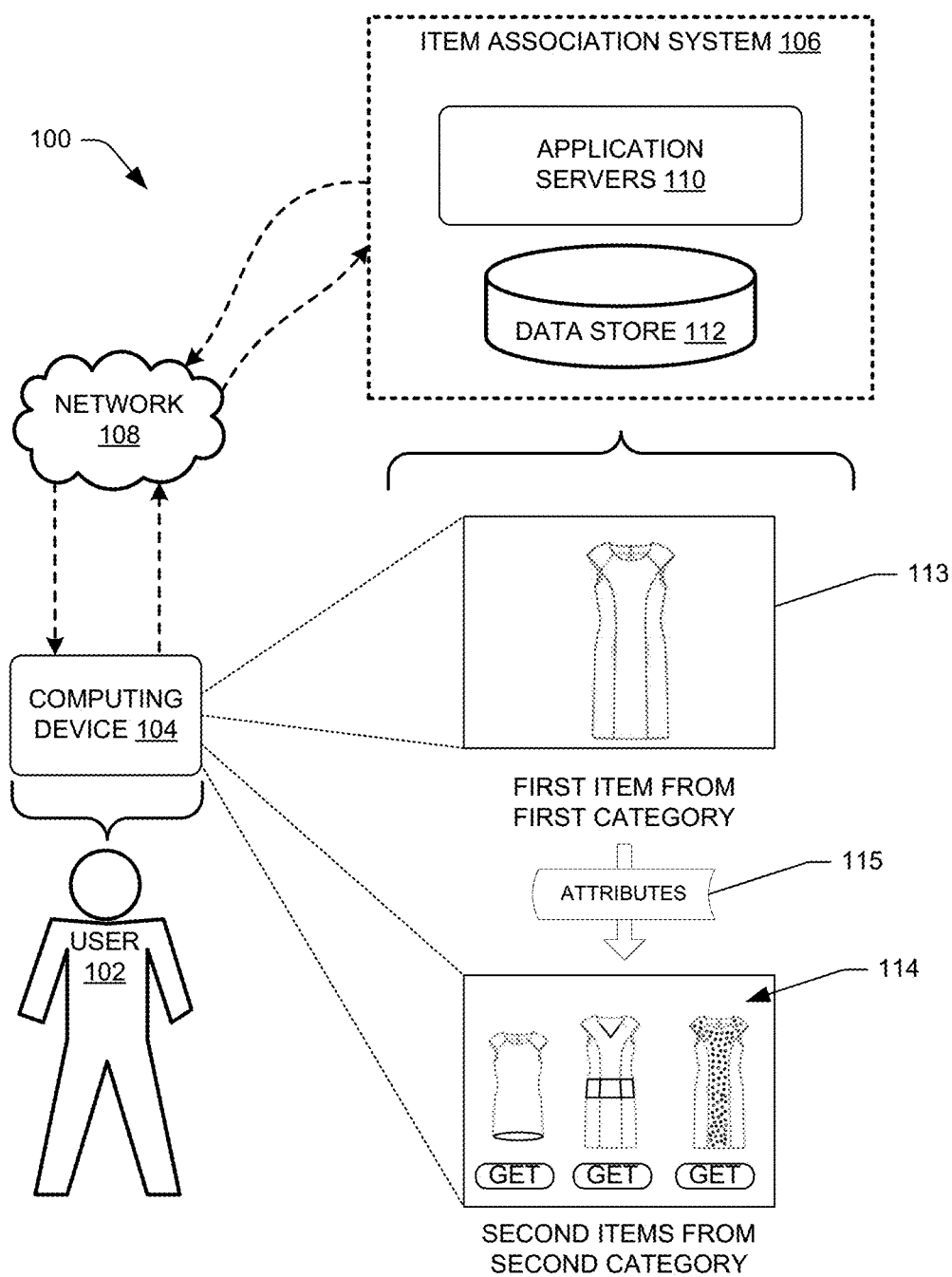
FIGS. 1A and 1B are schematic diagrams of an illustrative computing environment usable to perform cross-category item associations using machine learning.

This disclosure is generally directed to using a machine learning engine to identify items in a second item category that have a similar visual appearance to a first item selected from a first item category. The items may include image data and text data, such as descriptions, metadata, and other data and/or text. The image data and text data may be analyzed and processed to identify item attributes for each of the items. The item attributes may then be leveraged, using an association model generated by a machine learning engine, to identify items in different item categories that have a similar visual appearance to the visual appearance of a first item from a first item category. In some embodiments, the attributes may be used to define or quantify parameters associated with each item. The parameters may be inputs to the association model, which are used to rank associations with other, second items based in part on a selected first item. In various embodiments, user input may modify influence of certain parameters and/or attributes during use of the model.

As an example, an item association application may be used to identify clothing from a catalog of girls' clothing that has a visual appearance similar to a visual appearance of a selected women's clothing item. This may be particularly helpful when the catalog of girls' clothing does not include a same clothing item or clothing items from a same supplier or manufacturer as the selected women's clothing item. The association model may be used to identify a girls' dress that has a visual appearance similar to the visual appearance of a selected women's dress, for example, as a result of having similar parameter values, where the parameter values may be associated with color, pattern, clothing style, clothing shape, neckline type, sleeve type, and/or hemline type when the items are clothing. However, different parameters may be used for different types of items. In this example manner, a user may select a first item and identify a second item from a different item category (e.g., girls' clothing or other categories) that has a visual appearance similar to the visual appearance of the first item. By using this approach, a large amount of data may be leveraged efficiently to create the association model, which may, in at least some examples, result in faster, more accurate, and comprehensive associations of items from larger item databases, while more efficiently using computing resources, such as power, network bandwidth, processing time, and memory.

In some examples, the image data and text data associated with a large number of different items from different item categories may be processed by the machine learning engine to create the association model, which may be deployed as described above to determine associated items. In some embodiments, the machine learning engine may associate the item attributes extracted from the image data and text data, and categorize the attributes into associated parameter types. The parameter types may then be used to identify items from a different item category that have a visual appearance similar to the visual appearance of the first item. In various embodiments, the machine learning engine may determine weights for the parameter types, and the weights may calibrate or apportion the influence of the respective parameter types on the search results. The machine learning engine may use training data to train the association model, and thus to determine the association of attributes to parameters and/or weight for parameters, among other possible components of the association model.

The association model may be deployed to analyze the image data and text data associated with a large data base of items from item categories that are different than the first item category, and identify items from the different item categories that have a visual appearance similar to the visual appearance of the first item. The association model may be updated over time by the machine learning engine as data correlations associated with the items evolve over time. The association model may be used by an item association application which provides various user interfaces to receive user input, which may be used in some embodiments, by the association model. In one or more embodiments, the item association application may enable user input to influence weights for the parameters, which may be different weights than those provided by the machine learning engine. Continuing with the example association of girls' clothing, the item association application may receive a user input to more heavily weigh color over pattern when using the model to associate (or rank) items based on a first selected item. Of course, other parameters may be weighted in different ways using user input received via user interfaces provided by the item association application.

The techniques and systems described herein may be implemented in a number of ways. Example implementations are provided below with reference to the following figures.

FIG. 1A is schematic diagram of an illustrative computing environment 100 usable to perform item searches using machine learning. The example computing environment 100 shown in FIG. 1A may include a user 102 that may use a computing device 104 (or user device) to access an item association system 106, for example, across a network 108. The user 102 may be an individual or entity that desires to locate items from an entity associated with the item association system 106. The items may include, but are not limited to, physical items, such as clothing, accessories, jewelry, shoes, watches, and home furnishings, or other types of items consumable by the user 102.

The computing device 104 may be a personal computer ("PC"), a desktop workstation, a laptop, a notebook, a smartphone, a tablet or slate computer, an electronic-book reader, a wearable computing device (such as a smartwatch or a virtual reality ("VR") head-mounted display), a game console, a set-top box, a consumer electronics device, a server computer, or any other computing device capable of connecting to the network 108 and communicating with the item association system 106. The network 108 may be wired and/or wireless, such as a local-area network ("LAN"), a wide-area network ("WAN"), the Internet, or any other networking topology known in the art that connects the computing device 104 to the item association system 106. The item association system 106 may include any number of application servers 110, which may or may not be in a distributed, cloud configuration, configured to provide various services to the computing device 104 over the network 108. The user 102 may use a client application executing on the computing device 104 to access and utilize the services provided by the application servers 110.

The item association system 106 may include a data store 112, which may include items, user profiles, user information, item information, and/or other information created by the application servers 110 or used by the application servers. In some instances, the item association system 106 may be configured to offer a function allowing the user 102, via the computing device 104, to search items available from the item association system 106. For example, when the user 102 inputs the search query, a request 124 (FIG. 1B) may be executed. In response, the item association system 106 may perform a search of the data store 112, such as a search of item catalog data to identify items matching the search query. The item association system 106 may allow a user, via the computing device 104, to select a first item 113 from a first category. The first item 113 may include item details. The item details may include, but are not limited to item text data, the item image data, and/or other information about a selected item. In the context of clothing, examples of item categories may include, but are not limited to, women's clothing, women's accessories, women's jewelry, girls' clothing, girls' accessories, girls' jewelry, men's clothing, men's accessories, men's jewelry, boys' clothing, and boys' accessories. For example, the user 102 may submit a search query in the form of a search request 124 in the item category of women's clothing, seeking to identify a women's dress having certain attributes. In response, the item association system 106 may perform a search of item catalog data identifying women's dresses that have attributes matching the attributes included in the search query. The user 102 may select, via the computing device 104, a dress from the search results as the first item 113.

The item association system 106 may enable the user 102 to identify item from a different item category (e.g., girls' clothing) having a visual appearance similar to the visual appearance of the first item 113 selected from the first item category (i.e., women's clothing). In some conventional systems, the user 102 would typically be required to conduct as second search in the second item category. For example, a user 102 may wish to identify a second dress that would fit a small girl and have visual similarities to the first dress. This second search, which is independent from the first search that identified the first dress in the first item category, may return dozens of items from the second item category, many of which may not be particularly relevant because they do not include attributes that result in the identified items from the second item category having the desired visual similarities with the first dress. Non relevant search waste computing resources and time, and often frustrate users. Thus, the user 102 may be required to visually review the many items identified by the second search to determine whether any of the items from the second item category have the desired similarities with the first item, which may be undesirably tedious and time consuming.

In some examples of the present disclosure, the item association system 106 may be configured to identify second items 114 from a second item category that have a visual appearance similar to the visual appearance of the first item from the first item category. For example, the item association system 106 may be configured to identify second dresses from the girls' clothing item category that have respective visual appearances that are similar to the visual appearance of a women's dress from the women's clothing item category. To identify the second items 114, a machine learning engine may leverage attributes 115 that are common and/or similar between the first item 113 and the second items 114. In some examples, rather than leveraging attributes, the machine learning engine may analyze an image associated with the first item 113 and compare that image to images associated with the second items 114, for example, without extracting the attributes. The user 102 may then select for consumption, one of the second items 114 if the user so desires. The attributes 115 may be used to create parameters, which may represent various attributes. Although dresses, women's clothing, and girl's clothing have been used as examples, other item types, clothing types, and item categories are contemplated.

Figure 1B:
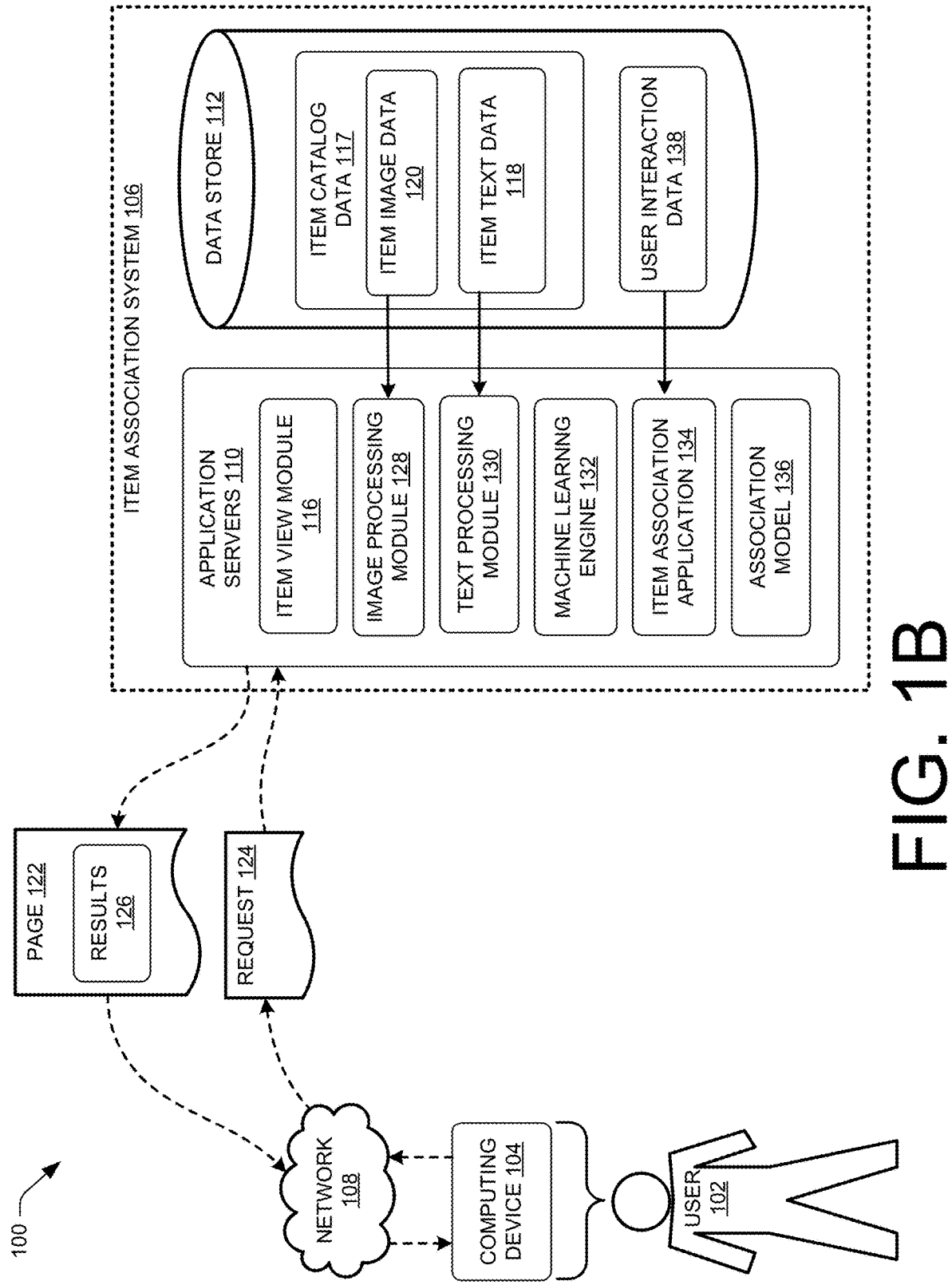

FIG. 1B is schematic diagram of a more detailed version of the illustrative computing environment 100. The application servers 110 may be configured to execute a number of modules in order to provide the services, such as electronic commerce services, to the computing device 104. The modules may be configured to execute on a single application server 110 or in parallel across multiple application servers in the item association system 106. In addition, each module may include a number of subcomponents executing on different application servers 110 or other computing devices in the item association system 106. The modules may be implemented as software, hardware, or any combination of the two.

In some examples, an item view module 116 may be configured to execute on the application servers 110. The item view module 116 may be configured to retrieve information regarding a particular item provided by a service from item catalog data 117, generate item details containing the item information, and transmit the item details over the network 108 to the client application for presentation to the user 102 via the computing device 104. The item catalog data 117 may be stored in the data store 112, such as a database or other storage mechanism available to the application servers 110 in the item association system 106 or accessible to the item association system 106.

The item catalog data 117 may contain item text data 118, which may include metadata and/or textual data for each item offered by the service associated with the item association system 106. The item text data 118 may include, but is not limited to, information about an item, such as the name, model, price, description, features, user reviews, and specifications of an item. Item image data 120 may also be stored for the items available from the item association system 106. The item image data 120 may include graphical images of the items and/or the packaging of the items. The item image data 120 may be stored using the JPEG, PNG, or GIF image formats. Other image formats may also be utilized to store the item image data 120. The item image data 120 may be analyzed to extract additional attributes about each item, such as color, pattern, design features, and other attributes.

The item details transmitted by the application servers 110 to the computing device 104 may be contained in network pages 122, which may include hypertext markup language ("HTML"), extensible markup language ("XML"), and/or JAVASCRIPT object notation ("JSON") that contains some or all of the item text data 118 and item image data 120 for the represented items, along with instructions regarding how the information is to be displayed on the computing device 104. Any number of methods and technologies may be used that allow the item view module 116 to encode the item information in the item details and send the item details to the computing device 104 for display to the user 102. Other information transmitted from the item view module 116 to the computing device 104 may be similarly formatted.

In some examples, the item view module 116 may be configured to offer a search function allowing a user 102 to search items available from the item association system 106 by typing a search query into a search network page. For example, when the user 102 inputs the search query, a request 124 may be transmitted to the item view module 116. In response, the item view module 116 may perform a search of the item catalog data 117 to identify items associated with the search query. The item view module 116 may thereafter return a page 122 to the computing device 104 that includes results 126 of the supplied query. In turn, the client application executing on the computing device 104 may render the page 122 for viewing by the user 102. One illustrative search results page 122 will be described below with respect to FIGS. 4A-4C.

The user 102 may also select one of the items represented in the results 126 in order to obtain additional information regarding the selected item. In response to such a selection, the item view module 116 may provide a network page that includes item details for the selected item. The item details may include, but are not limited to, some or all of the item text data 118, the item image data 120, and/or other information about a selected item. In some examples, the page 122 may also provide functionality for allowing the user 102 to purchase the item.

In some examples of the present disclosure, the item association system 106 may be configured to identify second items from a second item category that have a visual appearance similar to the visual appearance of the first item from the first item category. For example, the item association system 106 may be configured to identify second dresses from the girls' clothing item category that have respective visual appearances that are similar to the visual appearance of a women's dress from the women's clothing item category. Although dresses, women's clothing, and girl's clothing have been used as examples, other item types, clothing types, and item categories are contemplated.

As shown in FIG. 1B, the example item association system 106 includes an image processing module 128, a text processing module 130, a machine learning engine 132, an item association application 134, and an association model 136. In some examples, the image processing module 128 may be configured to analyze item image data 120 obtained from the item catalog data 117 to identify attributes of the item associated with the item image data 120, such as, for example, the item type (e.g., a dress), the item color, the item pattern, clothing style, shape, neckline type, sleeve type, and hemline type. Other types of items and relevant attributes are contemplated.

The image processing module 128 may use image analysis techniques known to those skilled in the art to identify the attributes, such as, for example, feature extraction techniques to identify lines, edges, ridges, textures, and shapes in the image data. In some examples, the images may be pre-processed to, for example, re-sample them, reduce noise in the data, and/or enhance the contrast in the images. In some examples, the image processing module 128 may use one or more of the following techniques to analyze the images: point of interest selection, segmentation, image recognition, and image registration.

In some examples, the text processing module 130 may be configured to receive item text data 118 from the item catalog data 117, such as metadata and textual item descriptions, and identify attributes of the item associated with the item text data 118. In some examples, the text processing module 130 may use known text analysis techniques to identify the item attributes, such as, for example, natural language processing (NLP).

In various embodiments, the machine learning engine 132 may process the image data and text data associated with a large number of different items from different item categories may be to create the association model 136, which may be deployed as described above to determine associated items. In some embodiments, the machine learning engine 132 may associate the item attributes extracted from the image data and text data, and categorize the attributes into associated parameter types. The parameter types may then be used to identify items from a different item category that have a visual appearance similar to the visual appearance of the first item. In various embodiments, the machine learning engine 132 may determine weights for the parameter types, and the weights may calibrate or apportion the influence of the respective parameter types on the search results. The machine learning engine 132 may use training data to train the association model 136, and thus to determine the association of attributes to parameters and/or weight for parameters, among other possible components of the association model 136.

The machine learning engine 132 may employ one or more algorithms, such as supervised learning algorithms (e.g., artificial neural networks, Bayesian statistics, support vector machines, decision trees, random forest, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In at least one example, training data used for training the machine learning engine 132 may include data associated with a plurality of previous user interactions, and/or other user feedback or interaction with the association model 136 or output from the association model 136.

The association model 136 may be deployed to analyze the image data and text data associated with a large data base of items from item categories that are different than the first item category, and identify items from the different item categories that have a visual appearance similar to the visual appearance of the first item. The association model 136 may be updated over time by the machine learning engine 132 as data correlations associated with the items evolve over time. The association model 136 may be used by the item association application 134 which provides various user interfaces (UIs) to receive user input, which may be used in some embodiments, by the association model 136. In one or more embodiments, the item association application 134 may enable user input to influence weights for the parameters, which may be different weights than those provided by the machine learning engine. Continuing with the example association of a girls' clothing, the item association application may receive a user input to more heavily weigh color over pattern when using the model to associate (or rank) items based on a first selected item. Of course, other parameters may be weighted in different ways using user input received via user interfaces provided by the item association application.

For example, the item image data 120 and item text data 118 may be used by the item association application 134 to create training data for the machine learning engine 132 to use to build the association model 136. In some examples, the training data may be created by analyzing training item image data 120 and training item text data 118 associated with each of a large number of training items. An item category may be assigned for each of the plurality of training items used to create the training data. For each of the analyzed training items, attributes for each of the training items may be identified from the training item image data and the training item text data. In some examples, the attributes may be associated with a visual appearance of each of the training items being analyzed. Parameter types may be identified for each of the item categories. In some examples, the parameter types may include one or more of, for example, clothing type, color, pattern, clothing style, shape, neckline type, sleeve type, and hemline type. Other parameter types are contemplated. In some examples, each of the attributes for each of the plurality of analyzed training items may be categorized into at least one of the parameter types.

In some embodiments, the machine learning engine 132 may analyze the item image data, the item text data, the item category, the attributes, and the parameter types from the training data to create correlations between the item image data, the item text data, the item category, the attributes, and the parameter types. Based on this analysis, the machine learning engine 132 may create the association model 136, which may use the attributes of the parameter types to calculate an association score based on the correlations. The machine learning engine 132 may create weights for different parameters, which may be used by the association model 136. In some examples, the association model 136 may include user weights for individual parameter types that apportion the influence of the parameter types in calculation of the association score, thus allowing users to influence an output of the association modules via user input received by user interfaces, such as the user interfaces shown in FIGS. 4A-4C.

In some examples, the machine learning engine 132 may be configured to update the weights based at least in part on repeated calculations of the association score to improve the accuracy of the association model 136. For example, user interaction data 138 may be used by the machine learning engine 132 to further refine the item association application 134 and/or the association model 136 over time as users provide feedback (e.g., via interaction with a UI, etc.) to the machine learning engine 132. For example, as users 102 initiate searches for items in the different item categories and select or refrain from selecting items identified by the item association application 134, the machine learning engine 132 may use this user interaction data 138 to update or revise the item association application 134 and/or the association model 136 as data evolves over time.

In some examples, the machine learning engine 132 may create or modify the association model 136 at different times. For example, the user interaction data 138 may be analyzed by the machine learning engine 132 to determine indicators (e.g., attributes associated with item parameter types) that result in strong correlations between the item image data 120 and the item text data 118 and items that have similar or matching visual appearances. The machine learning engine 132 may determine weights that apportion an influence of each of indicators and/or parameter types. The machine learning engine 132 may generate the association model 136 using the indicators and weights, which work as a function to create an association score that indicates a likelihood of an item having a visual appearance that matches or is similar to the visual appearance of another item. In some examples, the association model 136 may also be implemented without the use of weights.

In some examples, the association model 136 may use the data associated with each of the items and determine an association score that indicates the likelihood of a second item having a visual appearance that matches or is similar to the visual appearance of the first item. For example, based on a selected first item (e.g., a dress) from a first item category (e.g., women's clothing), the item association application 134 and/or the association model 136 may receive the first item image data 120 and the first item text data 118 associated with the first item, for example, from the item data catalogue 117. In some examples, the first item may have been previously identified as a result of a search query by the user 102, for example, as explained herein. The item association application 134 and/or the association model 136 may analyze the first item image data and the first item text data to identify first attributes of the first item, wherein the first attributes are associated with a visual appearance of the first item. The item association application 134 and/or the association model 136 may thereafter categorize the first attributes into parameter types associated with the first item category, wherein the parameter types may include, for example, one or more of color and pattern. In some examples, the parameter types may include clothing type (e.g., dress or pant suit), clothing style, shape, neckline type, sleeve type, hemline type, etc. The item association application 134 and/or the association model 136 may thereafter identify a second item from a plurality of second items different than the first item (e.g., an item from a different item category), with the second item having a visual appearance similar to the visual appearance of the first item, but with the plurality of second items being in a second item category (e.g., girls' clothing) that is different than the first item category (e.g., women's clothing).

In some examples, identifying the second item may include calculating, using the association model 136, an association score associated with second attributes of parameter types associated with each of the plurality of second items. Based at least in part on the association score, similarities between the first attributes associated with the first item and the second attributes associated with each of the plurality of second items may be determined. Identifying the second item may also include identifying a second item having a visual appearance similar to the visual appearance of the first item from the plurality of second items for which the association score is (1) above a threshold association score and/or (2) is among highest ranked association scores. In some examples, a plurality of association scores may be calculated for each of the second items analyzed, and the second items associated with respective association scores that are above a threshold association score may be identified as having a similar visual appearance. In some examples, the threshold association score may be selected or designated by the user 102, for example, via a user interface. In some examples, the threshold association score may be determined by the machine learning engine 132 based on, for example, statistical models or other methods. In some examples, the association scores may be ranked in descending order, and the second items having association scores that rank highest may be identified as having a similar visual appearance. In some examples, the user 102 may select or designate the number of ranked scores for which second items are identified, for example, via a user interface. In some examples, the association score may be derived from, or correlate to, a loss function, which may, for example, be inversely related to the association score.

In some examples, the item association application 134 and/or the association model 136 may be configured to calculate a confidence score associated with each of the second items identified as having an association score above the threshold association score and/or an association score among the highest ranked association scores. The confidence score may be associated with a probability that the association score is accurate. For example, the item association application 134 and/or the association model 136 may determine that one of the attributes of the first item, which may be, for example, a dress, is that the dress has a V-neck neckline type. However, due to the quality of the item image data (e.g., the angle at which the dress is shown), the correlation between the item image data and the V-neck attribute may not be very strong. In such cases, the confidence score may be low. In such situations, a person may manually determine whether the dress, in fact, has a V-neck neckline type, and in some examples, update the item association application 134 and/or the association model 136.

Figure 2:
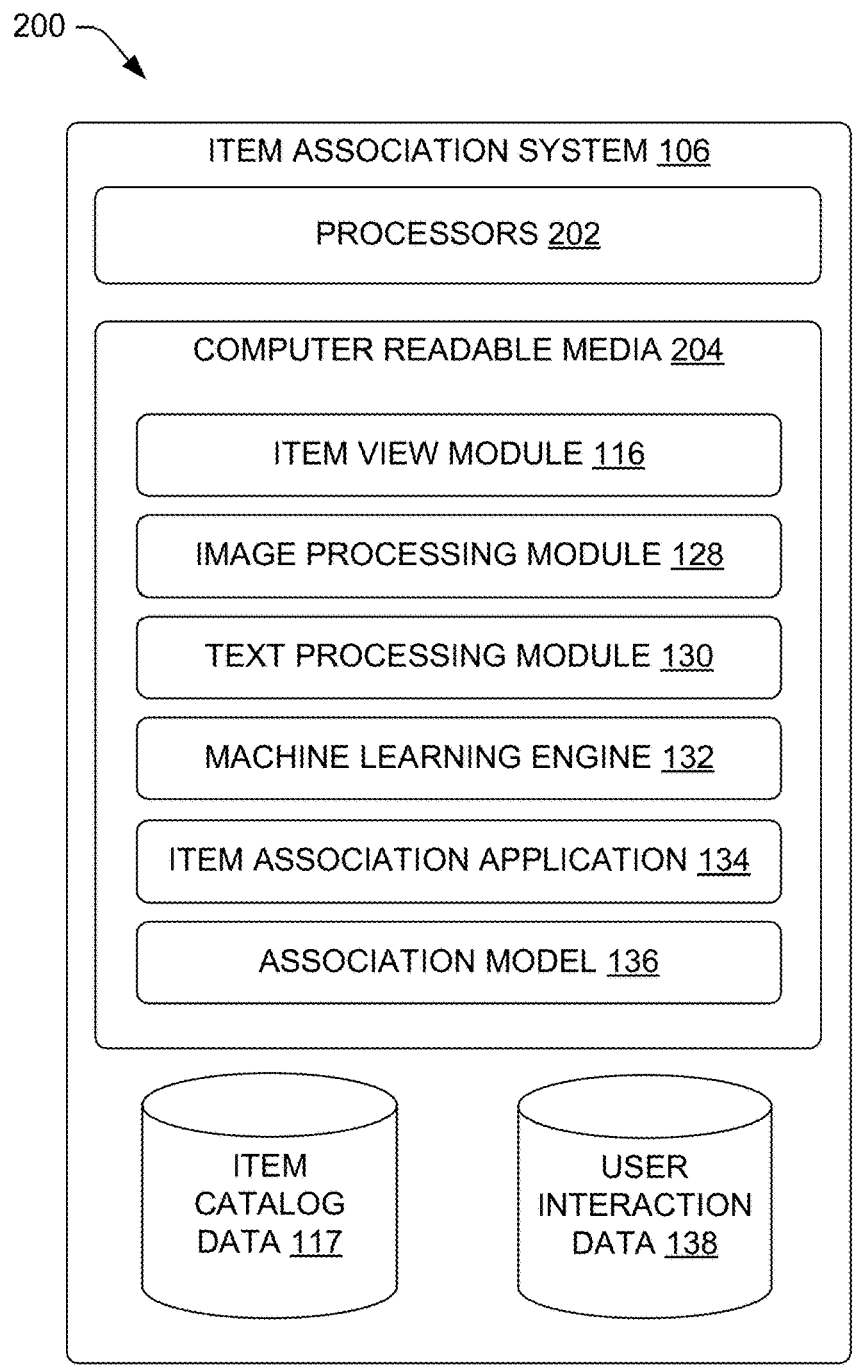
FIG. 2 is a block diagram of an illustrative computing architecture to perform cross-category item associations using machine learning.

FIG. 2 is a block diagram of an illustrative computing architecture 200 to perform searches for items having a visual appearance similar to the visual appearance of a first item using machine learning. The computing architecture 200 may be implemented in a distributed or non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the item association system 106.

Embodiments may be provided as a computer program item including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program item including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store the item view module 116, the image processing module 128, the text processing module 130, the machine learning engine 132, the item association application 134, and the association model 136, which are described herein. The components may be stored together or in a distributed arrangement. The item association system 106 may also store or have access to the item catalog data 117 and the user interaction data 138, which may be stored locally and/or remotely.

Figure 3:
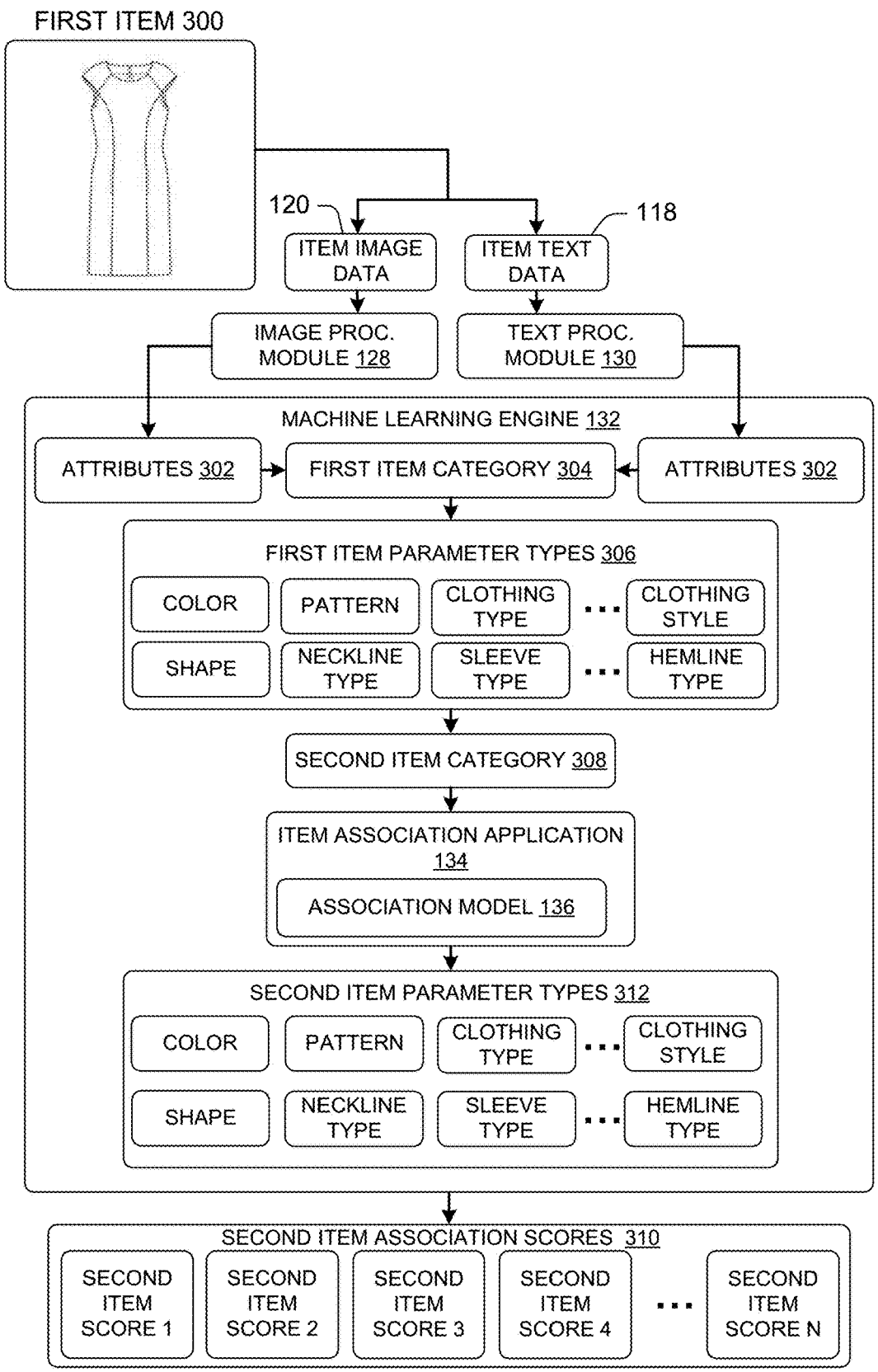
FIG. 3 is a block diagram showing an example item association system identifying a group of second items from a second item category that have a visual appearance similar to a first item selected from a first item category.

FIG. 3 is a block diagram of an example item association system 106 showing an example identifying a group of second items from a second item category that have a visual appearance similar to a first item selected from a first item category. For example, as shown in FIG. 3, a first item 300 has been selected, for example, as described herein. The example first item 300 is a women's dress, but other items and item types are contemplated. Based the first item 300 selected, the example item association system 106 provides item image data 120 and item text data 118 associated with the first item 300 that may be obtained from, for example, the item catalog data 117. The image processing module 128 and the text processing module 130 may be configured to extract attributes 302 of the first item 300 from the item image data 120 and the item text data 118, respectively, for example, using the techniques described previously herein. In some examples, this may be performed by, or assisted by, the machine learning engine 132. From the attributes 302, the first item category 304 associated with the first item 300 may be determined, for example, via analysis of the attributes 302, which may provide textual data identifying the first item category 304. In some examples, the first item category 304 may be determined from the search query submitted by the user 102. In the example shown in FIG. 3, the first item category is women's dresses.

In some examples, the system may analyze the first item attributes 302 and categorize them into one or more of first item parameter types 306. In the example shown, the first item parameter types 306 that correspond to the example first item category 304 include clothing type (e.g., a women's dress), color, pattern, clothing style, shape, neckline type, sleeve type, and hemline type. Other parameter types are contemplated.

In the example shown, the item association system 106 includes a machine learning engine 132 configured to provide an item association application 134 with an association model 136, as described herein. In some examples, the first item attributes 302 and the first item parameter types 306 may be received by the item association application 134, which deploys the association model 136 to find second items from a plurality of second items from a second item category 308 that have a visual appearance that matches or is similar to the visual appearance of the first item 300. For example, the second item category 308 may be girls' dresses, and the association model 136 may be used to identify one or more girls' dresses that have a visual appearance that matches or is similar to the visual appearance of the women's dress of the first item 300. In some examples, the second item category 308 may be designated by the user 102 via, for example, a user interface. In some examples, the item association application 134 may be configured to convert the first item attributes 302 of the first item into attribute vectors that correspond to the first item parameter types 306. For example, a clothing type vector associated with the first item 300 may identify the clothing type as a dress. As other examples, a color vector may identify the color as blue, and a pattern type vector may identify the pattern as solid.

In some examples, the association model 136 may be configured to identify second items from the second item category 308 based on second items that have vectors that match or are similar to the vectors of the first item 300. In some examples, the association model 136 may use a loss function to identify one or more of the second items. In such examples, the output of the loss function is lower when the attributes of the first item are closer to or match the attributes of the second items identified by the association model 136. In some examples, rather than leveraging attributes, the machine learning engine 132 may analyze an image associated with the first item 300 and compare that image to images associated with the second items, for example, without extracting attributes to perform the associations with the second items.

In some examples, the association model 136 may be configured to calculate a second association score 310 associated with second attributes of second item parameter types 312 associated with each of the plurality of second items to determine similarities between the first attributes 302 associated with the first item 300 and the second attributes associated with each of the plurality of second items. For example, the association model 136 may be configured to identify one or more second items having a visual appearance similar to the visual appearance of the first item 300 from the plurality of second items for which the association score is a above a threshold association score and/or among the highest ranked association scores, as described herein.

As shown in FIG. 3, the association model 136 may analyze for each of the second items the second attributes corresponding to the second item parameter types 312, and calculate second item association scores 310 for each of the second items. For example, as shown in FIG. 3, the association model 136 has calculated second item association score 1 through second item association score N. In some examples, the second items associated with the second item association scores 310 may be displayed in a ranked order, for example, with the second items having the highest second item association scores 310 being displayed to the user 102, for example, via a user interface. In some examples, the user 102 may select the number of second items displayed based either on rankings or a threshold association score that may be designated by the user 102, for example, via a user interface.

Figure 4A:
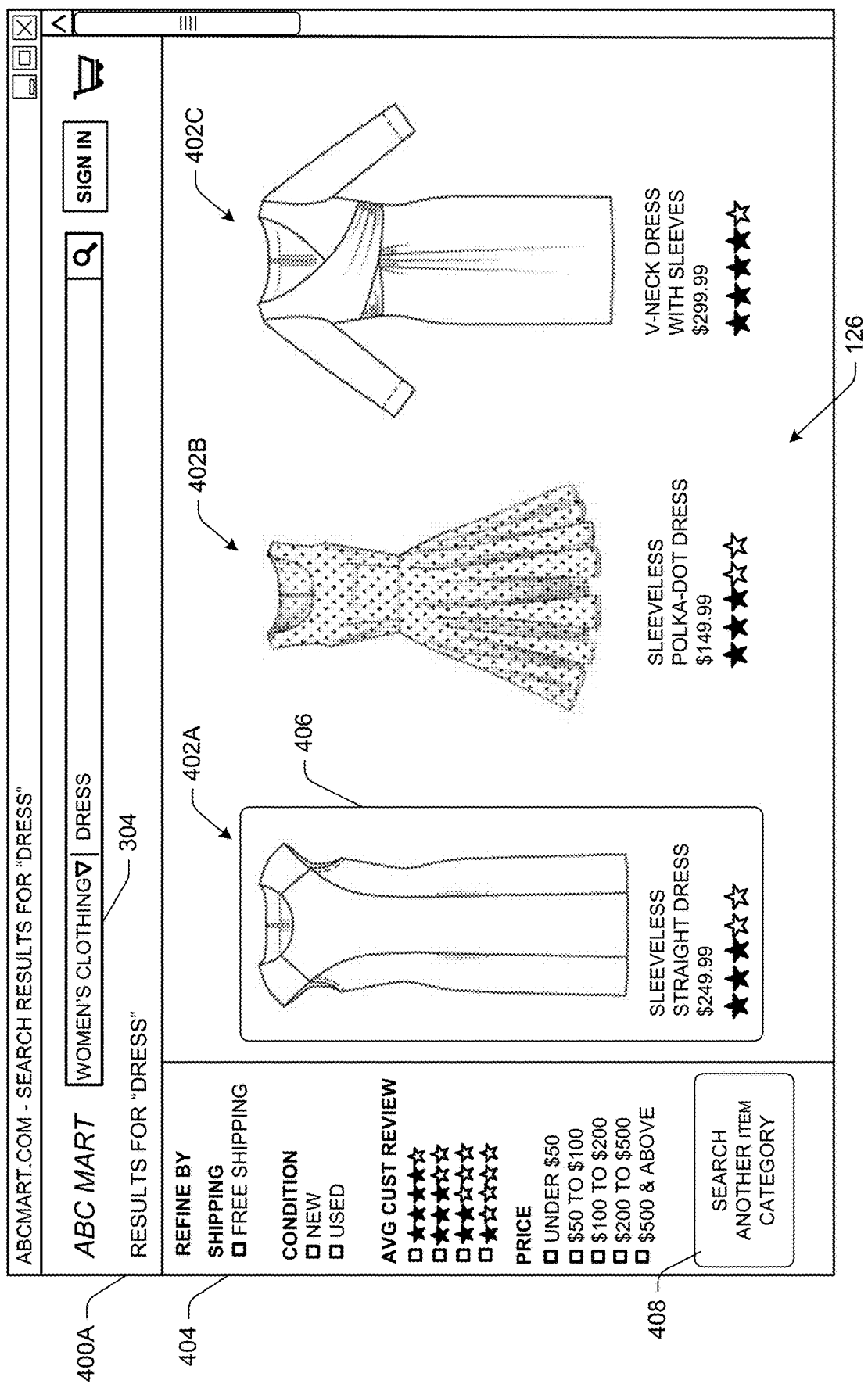
FIGS. 4A-4C show illustrative user interfaces (UIs) to facilitate cross-category item associations using machine learning and output of items having item associations.
Figure 4B:
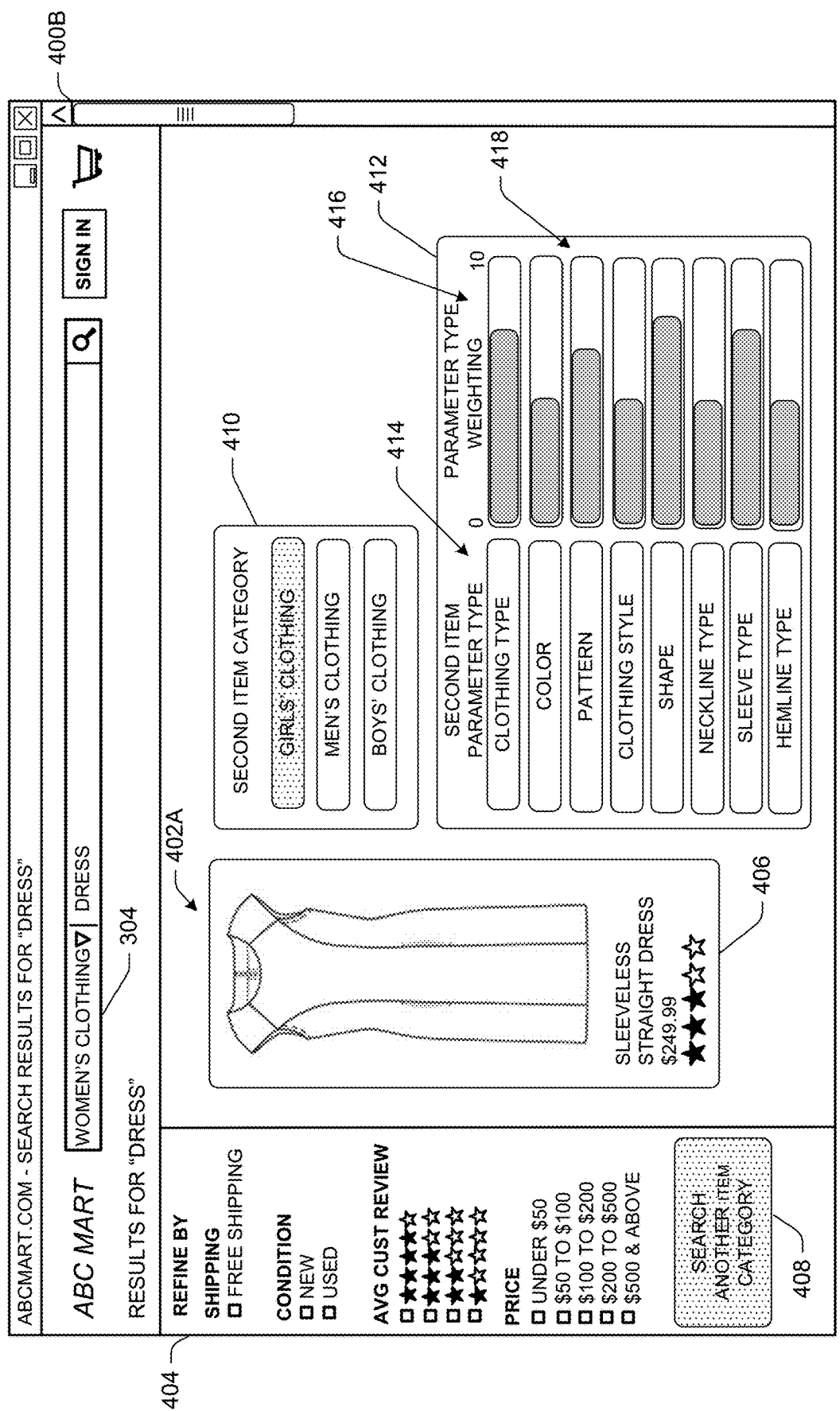
Figure 4C:
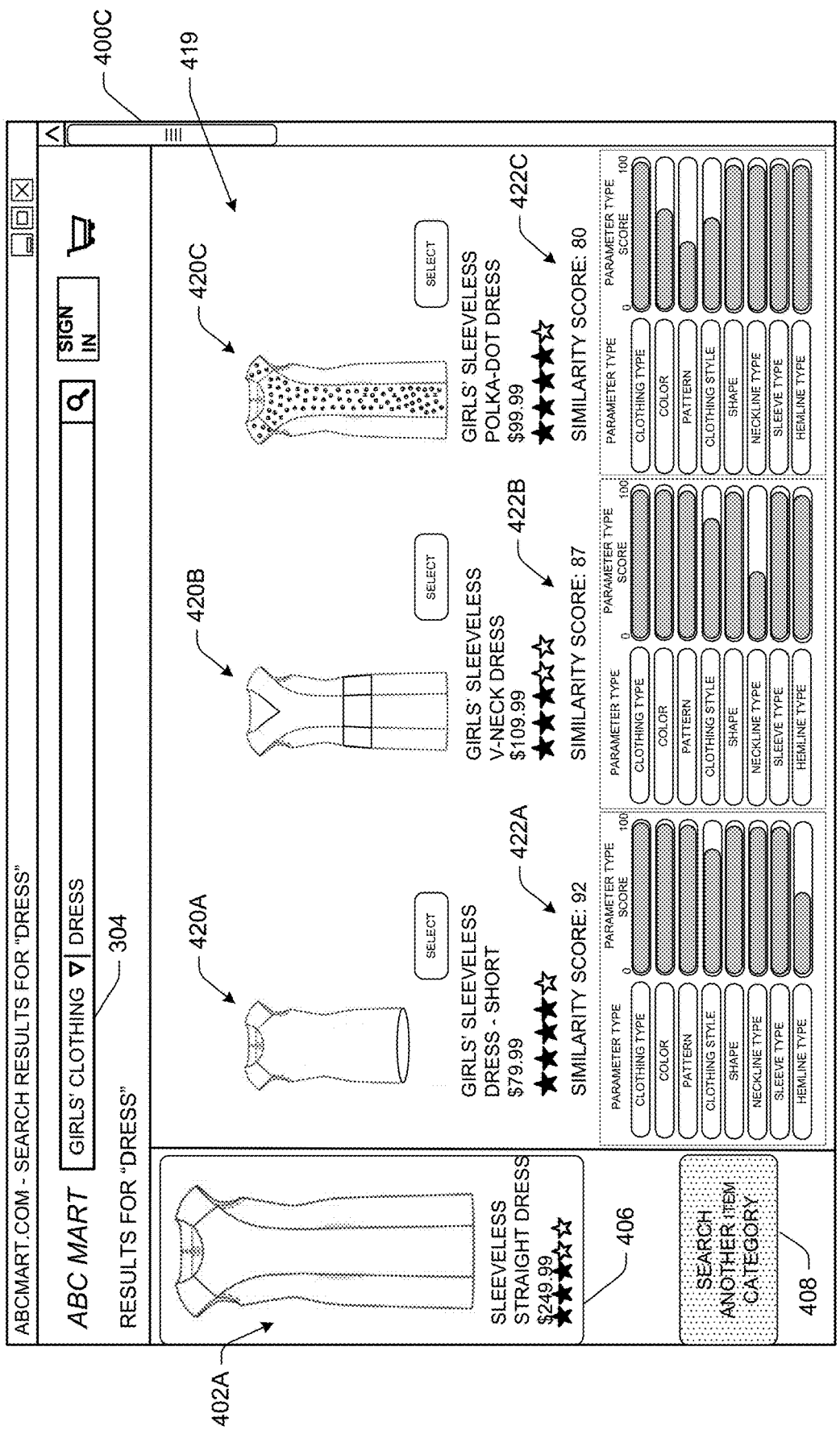

FIGS. 4A-4C show user interface diagrams showing example configurations for a human-machine interface for searching for items in the item association system 106. In FIG. 4A, an example UI 400A is shown representing a conventional rendering of a page 122 that includes results 126 by a computing device 104. In the example shown, a user 102 has searched the item catalog data 117 for the term "dress" in the first item category 304. In response, the item view module 116 (or another module) performed a search of the item catalog data 117 and returned a network page that includes results 126 matching the term "dress."

As shown in FIG. 4A, the results 126 presented in the UI 400A include item images 402A-402C corresponding to each of the results 126. The UI 400A shown in FIG. 4A also includes conventional UI controls 404 for filtering the results 126. For example, the results 126 can be filtered by shipping cost, condition (e.g. new or used), average user review, and/or price. The results 126 can also be sorted based upon various factors.

The example UI 400A shown in FIG. 4A shows the item image 402A highlighted, for example, as represented by the highlight box 406. In some examples, upon highlighting the one of the results 126, the UI 400A may provide a selectable option to search for second items from a plurality of second items in a second item category that are different than the first item category. For example, the UI 400A provides a selection button 408 the may become active to permit the user 102 to search for a second item having a visual appearance similar to the visual appearance of the highlighted item 402A. This provides that ability to search for second items having a plurality of second item attributes, and each of the plurality of second item attributes may be associated with at least one of the plurality of parameter types, for example, as described herein.

By selecting the selection button 408, the UI 400A may transform into, for example, the example UI 400B shown in FIG. 4B. In the example UI 400B shown in FIG. 4B, additional search options may be provided to the user 102 via the UI 400B. In some examples, the UI 400B may provide a plurality of item category selectors for selecting the second item category. For example, the UI 400B may provide the user 102 with an item category selection menu 410 providing a list of item category choices for searching for the second items. In the example shown, the first item category 304 is women's dresses, and the item category selection menu 410 provides a list of relevant second item categories, such as, for example, girls' clothing, men's clothing, and boys' clothing. These second item categories are merely examples, and other second item categories are contemplated. In the example shown in FIG. 4B, the "GIRL'S CLOTHING" item category has been selected and is highlighted.

The example UI 400B shown in FIG. 4B also includes a parameter type weighting selection menu 412. The example parameter type weighting selection menu 412 provides the user 102 with a list 414 of the plurality of second item parameter types associated with the second item category 308, and respective selectable ranges 416 of weights associated with each of the plurality of second item parameter types. In some examples, each of the selectable ranges 416 of weights may apportion an influence of each of the plurality of second item parameter types on the search for second items. In the example shown, the example parameter type weighting selection menu 412 includes sliders 418 associated with each of the second item parameter types to permit the user with the option of selecting the weights of one or more of the second item type parameters. Other types selectors are contemplated. In the example shown in FIG. 4B, the weight ranges have been increased for clothing type, pattern, shape, and sleeve type, which may result in the association model 136 providing search results where the identified second items are visually similar with respect to those second item parameter types. In the example shown, the second parameter types correspond to the selected second item category (girls' clothing). In some examples, the second item parameter types may be unique and/or correspond to the selected second item category. For example, if a different second item category is selected (e.g., men's clothing), the second item parameter types may also be different, and thus, in such situations, the parameter type weighting selection menu 412 may identify second item parameter types different than those shown in FIG. 4B. In some examples, the UI 400B may provide a plurality of parameter type selectors for influencing the weights based at least in part on at least one of color similarity, pattern similarity, clothing type similarity, clothing style similarity, clothing shape similarity, neckline type similarity, sleeve type similarity, or hemline type similarity. For example, the list of second item parameter types 414 may be in the form of buttons that may be selected by user 102 to influence the weights used by the association model 136 to identify the second items. In some examples, selecting one of the second item parameter types in this manner may result in the identified second items being similar with respect to attributes associated with the selected second item parameter type.

FIG. 4C shows a UI 400C that includes a results section 419. The results section 419 may include second items, such second items 420A, 420B, and 420C, or more or fewer items, which are associated with the first item 402A selected from the UI 400B. Each of the second items may include a similarity score 422A, 422B, 422C, which may be determined by the association model 136. The second items 420A, 420B, and 420C may be selected based at least in part on the similarity score, and may be sorted according to the similarity score.

In some embodiments, the UI 400C may output comparisons 424A, 424B, and 424C that show differences and/or similarities with parameters for the first item. This information may be used to inform a user about the underlying reasons for association of a second item and/or may indicate differences between the first item and a particular second item.

Figure 5:
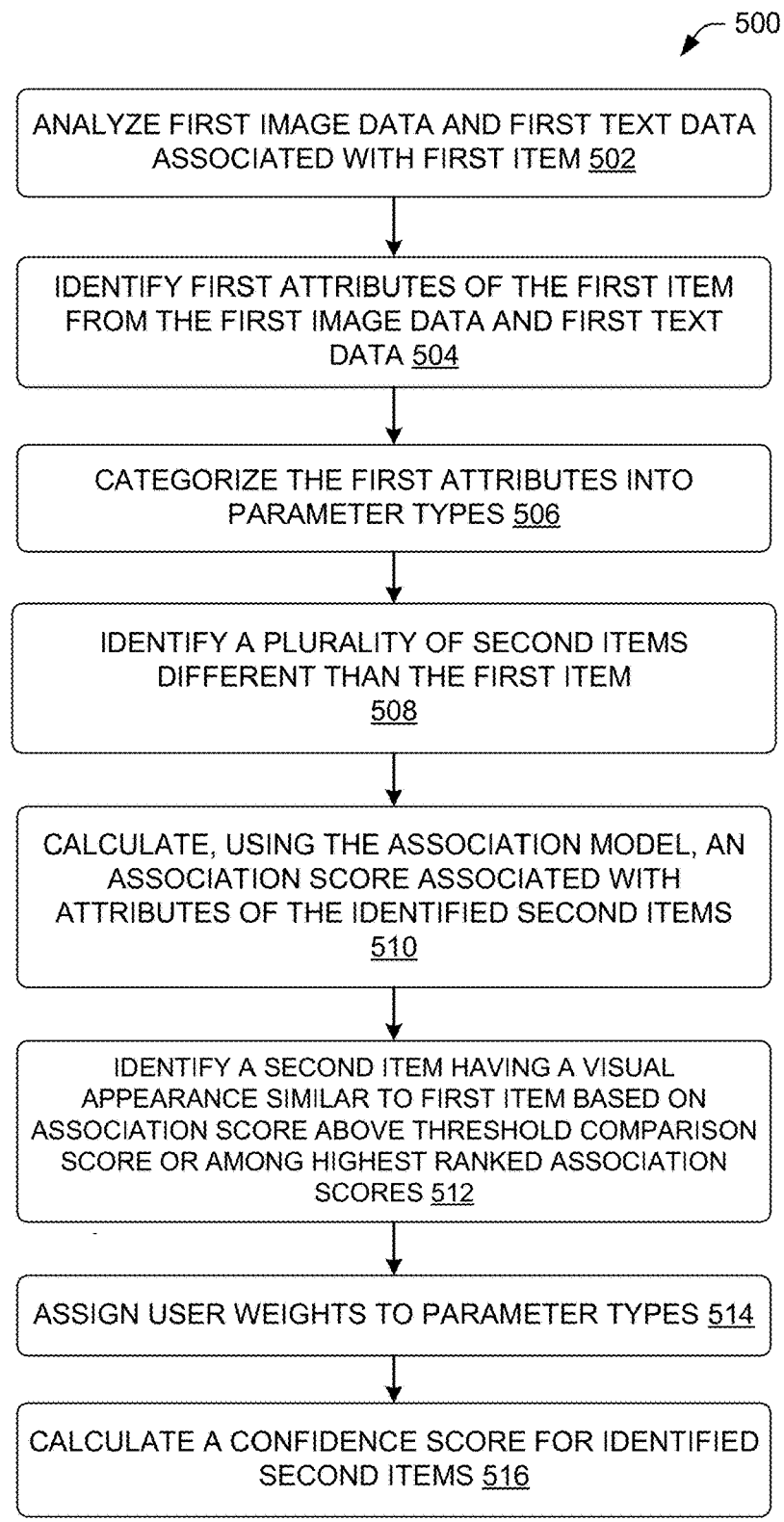
FIG. 5 is a flow diagram of an illustrative process to perform item associations across item categories using machine learning.
Figure 6:
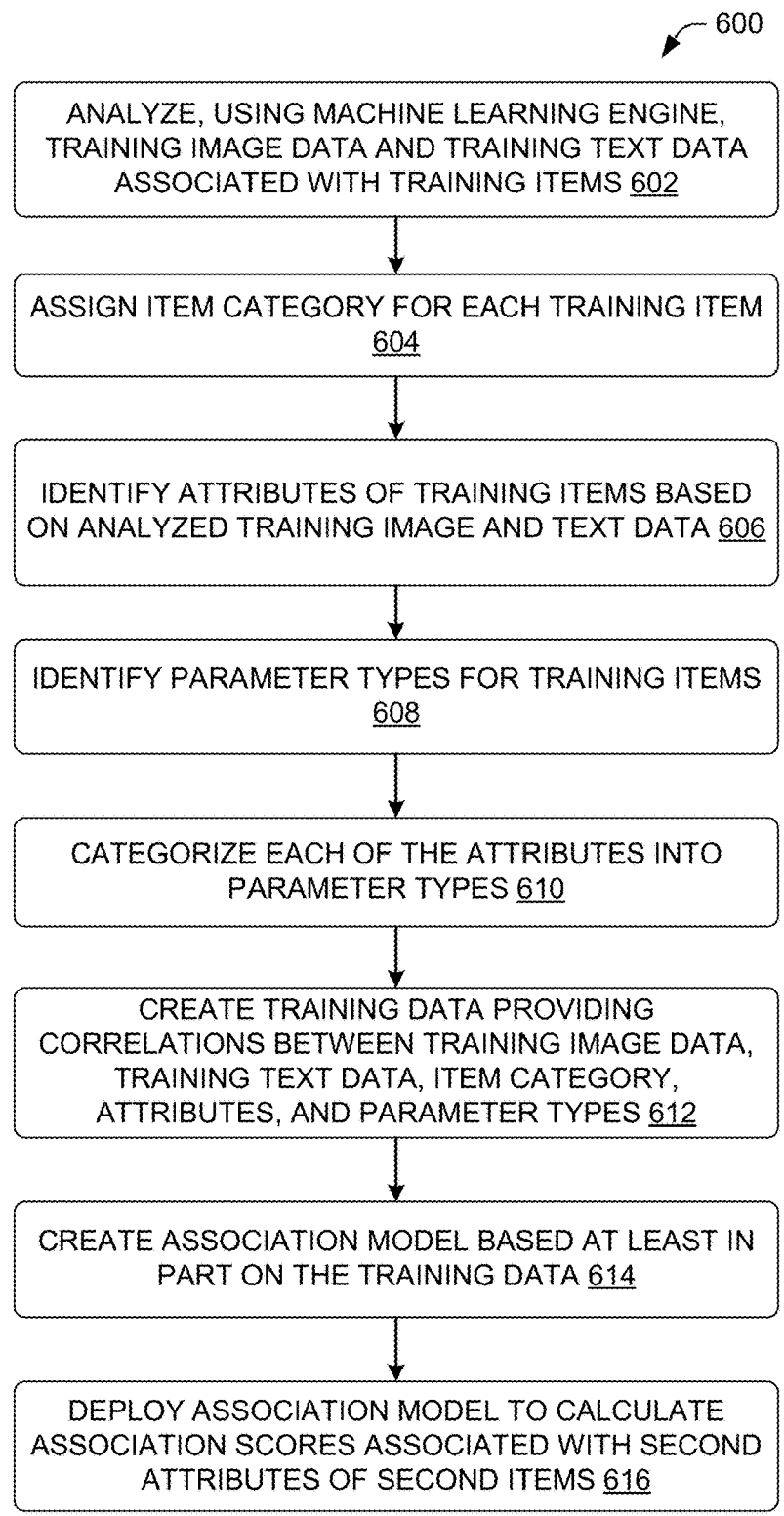
FIG. 6 is flow diagram of an illustrative process to train a machine learning engine to perform cross-category item associations using machine learning.

FIGS. 5 and 6 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 5 is a flow diagram of an illustrative process 500 to perform item searching using machine learning across item categories to identify items from a second item category that have a visual appearance similar to the visual appearance of a first item from a first item category that is different than the second item category. The process 500 is described with reference to the environment 100 and the computing architecture 200, and may be performed by a user 102 of an item association system, such as the example item association system 106.

At 502, first image data and first text data associated with a first item in a first item category may be analyzed. For example, an image processing module and a text processing module may be used to analyze the item image data and item text data associated with a first item selected by a user of an item association system.

At 504, first attributes of the first item may be identified from the first image data and the first text data. This analysis may be performed by the image processing module and the text processing module, which may use image and text analysis techniques to identify the first attributes. In some examples, the first attributes may be associated with a visual appearance of the first item, and identifying the first attributes may include extracting at least one of color data or pattern data from at least one of the first image data or the first text data. Other or different attributes may be extracted.

At 506, the first attributes may be categorized into parameter types associated with the first item category. This may be performed by the association model that is created and updated by the machine learning engine. In some examples, the parameter types may include color and/or pattern. In some examples, categorizing the first attributes into parameter types may include extracting image features from the image data and text features from the text data, and associating each of the image features and the text features with a parameter type.

At 508, a second item from a plurality of second items that are different than the first item may be identified. For example, the plurality of second items may be items associated with a designed item category (e.g., girls' dresses, men's shirts, etc.). The second items may be items available by a service and stored in the item catalog data 117, for example.

At 510, in some examples, identifying the second item may include calculating, using the association model, an association score associated with second attributes of parameter types associated with each of the plurality of second items to determine similarities between the first attributes associated with the first item and the second attributes associated with each of the plurality of second items. In some examples, calculating the association score associated with the similarities may include calculating a parameter association score for each parameter type, and combining the parameter association score for each parameter type to obtain the association score.

At 512, the process 500 may include identifying a second item of the plurality of second items having a visual appearance similar to the visual appearance of the first item from the plurality of second items for which the association score is above a threshold association score or among highest ranked association scores. For example, a threshold association score may be designated by a user of the item association system, and the process may only identify second items that have an association score above the threshold score. In some examples, a list of the second items may be provided in descending order beginning with the highest association score.

At 514, user weights may be assigned to each of the parameter types, where each of the weights apportions the influence of each of the parameter types on the association score. For example, assigning the weights to each of the parameter types may include providing a user interface configured to receive user designations for one or more weights for at least one of the parameter types, for example, as described herein.

At 516, the process 500 may also include calculating a confidence score associated with each of the second items identified as having at least one of an association score above the threshold association score or an association score among the highest ranked association scores. In some examples, the confidence score may be associated with a probability that the association score is accurate. Low confidence scores may be an indication that at least one of the item attributes was not strong, such as, for example, a very fine pattern might not provide a high confidence score in the pattern parameter type.

FIG. 6 is a flow diagram of an illustrative process 600 to train a machine learning engine to perform, for example, portions of the illustrative process 500. The process 600 is described with reference to the environment 100 and the computing architecture 200, and may be performed by a user 102 of an item association system, such as the example item association system 106.

At 602, the process 600 may include analyzing, using the machine learning engine, training image data and training text data associated with each of a plurality of training items. For example, item image data and item text data for a large population of items may be analyzed using an image processing module and a text processing module, which may employ image and text analysis techniques to identify attributes in the item image data and the item text data.

At 604, an item category may be assigned to each of the plurality of training items. For example, an item category may be women's clothing, girls' clothing, men's clothing, and boys' clothing. Other item categories are contemplated, as described herein.

At 606, the process 600 may include identifying, for each of the analyzed training items, from the training image data and the training text data, attributes of each of the training items. For example, the image and text processing modules may identify attributes, such as whether the clothing is a dress or a pant suit, the color of the clothing, any pattern in the clothing, any style consistent with the clothing, etc. Other attributes are contemplated.

At 608, parameter types may be identified for each of the item categories. For example, parameter types may include clothing type, color, pattern, clothing style, clothing shape, neckline type, sleeve type, and hemline type. Other parameter types are contemplated.

At 610, each of the attributes may be categorized for each of the plurality of training items into at least one of the parameter types. For example, each of the attributes may be assigned to a parameter type associated with the item category associated with the training item.

At 612, the process 600 may include creating training data providing correlations between the training image data, the training text data, the item category, the attributes, and/or the parameter types. This may be performed, for example, by the machine learning engine using the item association application.

At 614, an association model may be created based at least in part on the training data. The association model may be used to determine the similarities between the first attributes of a first item and second attributes associated with each of a plurality of second items in a second item category that is different than the item category associated with the first item, for example, as described herein.

At 616, the process 600 may also include deploying the association model to calculate an association score associated with the second attributes of parameter types associated with each of the plurality of second items to determine similarities between the first attributes associated with the first item and the second attributes associated with each of the plurality of second items. This may enable a user of the item association system to identify items from different item categories that have respective visual appearances that are similar or match. For example, a user may identify a dress from the women's clothing item category, and thereafter identify one or more dresses or other outfits from the girls' clothing item category that have a visual appearance that is similar to or matches the dress from the women's clothing item category.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. A system comprising:
one or more processors; and
memory storing computer-executable instructions that, when executed, cause the one or more processors to perform acts comprising:
creating training data by:
analyzing training image data and training text data associated with each of a plurality of training items;
assigning an item category for each of the plurality of training items;
identifying, for each of the plurality of training items, from the training image data and the training text data, attributes of each of the plurality of training items, wherein the attributes are associ- ated with a visual appearance of each of the plurality of training items;

identifying parameter types for each of the item categories, wherein the item categories comprise one or more of color and pattern; and categorizing each of the attributes for each of the plurality of training items into at least one of the parameter types;

creating an association model using a machine learning engine by:

analyzing the training image data, the training text data, the item category, the attributes, and the parameter types to create correlations between the training image data, the training text data, the item category, the attributes, and the parameter types; and creating the association model that uses the attributes of the parameter types to calculate a first association score based on the correlations, the association model including weights for individual parameter types that apportion an influence of the parameter types in calculation of the association score; and deploying the association model by:

receiving first image data that depicts a first item in a first item category and first text data associated with the first item;

analyzing the first image data and the first text data to identify, from the first image data and the first text data, first attributes of the first item, wherein the first attributes are associated with a first visual appearance of the first item;

categorizing the first attributes into first parameter types associated with the first item category, wherein the first parameter types comprise one or more of color and pattern;

searching, within a second item category that is different than the first item category and based on the first attributes or the first parameter types, for a second item having a second visual appearance that is similar to the first visual appearance of the first item;

identifying the second item from a plurality of second items that are different than the first item and that are within the second item category, wherein identifying the second item comprises:

calculating, using the association model, a second association score associated with second attributes of second parameter types associated with each of the plurality of second items to determine similarities between the first attributes associated with the first item and the second attributes associated with each of the plurality of second items; and identifying the second item having the second visual appearance similar to the first visual appearance of the first item from the plurality of second items for which the second association score is at least one of above a threshold association score or among highest ranked association scores.

2. The system as recited in claim 1, wherein the acts further comprise updating the weights based at least in part on repeated calculations of the first association score to improve an accuracy of the association model.

3. The system as recited in claim 1, wherein the acts further comprise providing a user interface configured to receive user designations that modify the weights for at least one of the parameter types.

4. The system as recited in claim 1, wherein the first item category comprises at least one of first clothing or first shoes for a first person having a first size, and the second item category comprises at least one of second clothing or second shoes for a second person having a second size different than the first size, and wherein the first item is provided by a first provider and the second item is provided by a second provider different than the first provider.

5. The system as recited in claim 1, wherein the first item category is women's clothing and the second item category is girls' clothing, and wherein the parameter types further comprise at least one of clothing type, clothing style, clothing shape, neckline type, sleeve type, or hemline type.

6. A method comprising:

analyzing first image data depicting a first item in a first item category and first text data associated with the first item;

identifying, from the first image data and the first text data, one or more first attributes of the first item, wherein the one or more first attributes are associated with a first visual appearance of the first item, and wherein identifying the one or more first attributes comprises extracting at least one of color data or pattern data from at least one of the first image data or the first text data;

categorizing the one or more first attributes into one or more first parameter types associated with the first item category, wherein the one or more first parameter types comprises at least one of color or pattern;

searching, within a second item category that is different than the first item category and based on the one or more first attributes or the one or more first parameter types, for a second item having a second visual appearance that is similar to the first visual appearance of the first item; and identifying the second item from a plurality of second items that are different than the first item and that are within the second item category, wherein identifying the second item comprises:

calculating, using an association model, an association score associated with one or more second attributes of one or more second parameter types associated with a subset of the plurality of second items to determine one or more similarities between the one or more first attributes associated with the first item and the one or more second attributes associated with the subset of the plurality of second items; and identifying the second item having the second visual appearance similar to the first visual appearance of the first item from the plurality of second items for which the association score is at least one of above a threshold association score or among highest ranked association scores.

7. The method as recited in claim 6, further comprising assigning weights to a second subset of the one or more second parameter types, each of the weights apportioning an influence of the second subset of the one or more second parameter types on the association score.

8. The method as recited in claim 7, wherein assigning the weights to the second subset of the one or more second parameter types comprises providing a user interface configured to receive user designations for one or more weights for at least one of the one or more second parameter types.

9. The method as recited in claim 6, further comprising calculating a confidence score associated with each of the plurality of second items identified as having at least one of a second association score that is above the threshold association score or that is among the highest ranked association scores, the confidence score being associated with a probability that the association score is accurate.

10. The method as recited in claim 6, wherein the first item category is first clothing for a first person provided by a first provider, and the second item category is second clothing for a second person provided by a second provider.

11. The method as recited in claim 6, wherein the first item category is women's clothing and the second item category is girls' clothing, and wherein the parameter types comprise at least one of clothing type, clothing style, clothing shape, neckline type, sleeve type, or hemline type.

12. The method as recited in claim 6, wherein categorizing the one or more first attributes into the one or more first parameter types comprises extracting image features from the first image data and text features from the first text data, and associating a second subset of the image features and the text features with a parameter type.

13. The method as recited in claim 6, wherein calculating the association score associated with the one or more similarities comprises calculating a parameter association score for each parameter type, and combining the parameter association score for each parameter type to obtain the association score.

14. The method as recited in claim 6, further comprising training the machine learning engine, wherein the training comprises:
   analyzing, using the machine learning engine, training image data and training text data associated with a second subset of a plurality of training items;
   assigning an item category for the second subset of the plurality of training items;
   identifying, for the second subset of the training items, from the training image data and the training text data, attributes of the second subset of the plurality of training items;
   identifying parameter types for a third subset of the item categories; and
   categorizing each of the attributes for the second subset of the plurality of training items into at least one of the parameter types.

15. The method as recited in claim 14, further comprising creating training data providing correlations between the training image data, the training text data, the item category, the attributes, and the parameter types.

16. The method as recited in claim 6, further comprising creating the association model, based at least in part on training data, for determining the one or more similarities between the one or more first attributes of the first item and the one or more second attributes associated with a second subset of the plurality of second items in the second item category.

17. The method as recited in claim 6, further comprising outputting a user interface to receive at least a first user selection of the first item and a second user selection of a second category associated with the plurality of second items.

18. A system comprising:
one or more processors; and
memory storing computer-executable instructions that, when executed, cause the one or more processors to perform acts comprising:
   identifying, from first image data and first text data, one or more first attributes of a first item in a first item category, wherein the one or more first attributes are associated with a first visual appearance of the first item, and wherein identifying the one or more first attributes comprises extracting at least one of color data or pattern data from at least one of the first image data or the first text data;
   categorizing the one or more first attributes into one or more first parameter types associated with a first item category, wherein the one or more first parameter types comprises at least one of color or pattern;
   searching, within a second item category that is different than the first item category and based on the one or more first attributes or the one or more first parameter types, for a second item having a second visual appearance that is similar to the first visual appearance of the first item; and
   identifying, using a machine learning model, the second item from a plurality of second items that are different than the first item and that are within the second item category, wherein identifying the second item comprises:
      calculating, using a machine learning model, a similarity score associated with one or more second attributes of one or more second parameter types associated with a subset of the plurality of second items to determine one or more similarities between the one or more first attributes associated with the first item and the one or more second attributes associated with the subset of the plurality of second items; and
      identifying the second item having a second visual appearance similar to the first visual appearance of the first item for which the similarity score is at least one of above a threshold similarity score or among highest ranked similarity scores.

19. The system as recited in claim 18, wherein the parameter types comprise at least one of clothing type similarity, clothing style similarity, clothing shape similarity, neckline type similarity, sleeve type similarity, or hemline type similarity.

20. The system as recited in claim 18, wherein calculating the similarity score comprises calculating a parameter type score for each parameter type, and combining the parameter type score for each parameter type to generate the similarity score.

* * * * *